US012811678B2

(12) United States Patent
Nakae et al.

(10) Patent No.: US 12,811,678 B2
(45) Date of Patent: Nov. 24, 2026

(54) REMOTE OPTICAL FIBER SWITCHING NODE AND ITS MONITORING METHOD

(71) Applicant: NTT, Inc., Tokyo (JP)

(72) Inventors: Kazuhide Nakae, Musashino (JP); Ryo Koyama, Musashino (JP); Hiroshi Watanabe, Musashino (JP); Kazunori Katayama, Musashino (JP)

(73) Assignee: NTT, Inc., Tokyo (JP)

( * ) Notice: Subject to any disclaimer, the term of this patent is extended or adjusted under 35 U.S.C. 154(b) by 161 days.

(21) Appl. No.: 18/872,855

(22) PCT Filed: Jun. 22, 2022

(86) PCT No.: PCT/JP2022/024922
§ 371 (c)(1),
(2) Date: Dec. 9, 2024

(87) PCT Pub. No.: WO2023/248383
PCT Pub. Date: Dec. 28, 2023

(65) Prior Publication Data
US 2025/0317201 A1 Oct. 9, 2025

(51) Int. Cl.
*H04B 10/077* (2013.01)
*H04B 10/275* (2013.01)

(52) U.S. Cl.
CPC ......... *H04B 10/077* (2013.01); *H04B 10/275* (2013.01)

(58) Field of Classification Search
CPC .... H04B 10/077; H04B 10/275; H04B 10/07; H04J 14/022; H04J 14/0305; H04J 14/0283; H04J 14/0295
See application file for complete search history.

(56) References Cited

U.S. PATENT DOCUMENTS

| | | | | |
|---|---|---|---|---|
| 6,735,392 B1 * | 5/2004 | Elahmadi | H04J 14/0283 398/4 |
| 2002/0097460 A1 * | 7/2002 | Ikoma | H04J 14/0305 398/31 |
| 2006/0140625 A1 * | 6/2006 | Ooi | H04J 14/022 398/19 |

* cited by examiner

*Primary Examiner* — Hibret A Woldekidan
(74) *Attorney, Agent, or Firm* — Fish & Richardson P.C.

(57) ABSTRACT

The present disclosure provides a remote optical path switching node connects two loop networks in which optical fibers are connected in a loop form. The two loop networks include an upper loop close to a tester that emits a test beam and lower loops away from the tester. The remote optical path switching node includes: an optical cross-connect connected to an optical fiber included in the lower loop; a test optical coupler connected to a test optical fiber through which a test beam propagates in the upper loop and which is connectable to the optical cross-connect; a control unit configured to control the connection between the optical cross-connect and the test optical coupler; and a light extraction unit configured to detect a test beam propagating in the upper loop and emitted from the test optical coupler or the optical cross-connect.

7 Claims, 13 Drawing Sheets

[1 ]

[11]

[13]

REMOTE OPTICAL FIBER SWITCHING NODE AND ITS MONITORING METHOD

CROSS-REFERENCE TO RELATED APPLICATIONS

This application is a National Stage application under 35 U.S.C. § 371 of International Application No. PCT/JP2022/024922, having an International Filing Date of Jun. 22, 2022, the disclosure of which is considered part of the disclosure of this application, and is incorporated by reference in its entirety into this application.

TECHNICAL FIELD

The present disclosure relates to monitoring of optical fiber connection during point-to-point connection in an optical fiber network.

BACKGROUND ART

In optical fiber networks, particularly, in access networks in which communication devices installed in housing stations and communication terminals (hereinafter referred to as user terminals) on user sides are connected to each other, in order to efficiently use facilities in opening and maintenance of the facilities, optical fibers switching is performed to connect or change optical fibers to any routes.

By transmitting test beams from housing stations to remote optical path switching nodes, it is possible to confirm the switching of the optical fibers in the remote optical path switching nodes. However, when point-to-point connection is performed in the optical fiber networks, the switching of the optical fiber may not be confirmed depending on connection modes of the point-to-point connection despite the transmission of the test beams from the housing stations.

For example, in optical fiber networks in which optical fibers are connected in loop forms to form loop networks and the loop networks are connected in multiple stages, remote optical path switching nodes that connect the loop networks are disposed. When the connection of the remote optical path switching nodes is confirmed, switching of the optical fibers cannot be confirmed despite transmission of the test beams from the housing stations.

CITATION LIST

Non Patent Literature

Non Patent Literature 1: Tomohiro Kawano, Tatsuya Fujimoto, Kazuhide Nakae, Hiroshi Watanabe, Kazunori Katayama, "Shorai hikari akusesu-mo ni muketa enkaku kouro kirikae nodo no kento", (In Japanese) (Review of Remote Optical Path Switching Node for Future Optical Access Network), Institute of Electronics, Information and Communication Engineers (IEICE) General Conference, 2021, B-13-16, 2021 Non Patent Literature 2: Hiroshi Watanabe, Tomohiro Kawano, Chisato Fukai, Ryou Koyama, Kazuhide Nakae, Tatsuya Fujimoto, Yoshiteru Abe, Kazunori Katayama, "Tadan rupu-gata ko-akusesu-mo de un'yo suru enkaku kouro kirikae nodo" (in Japanese) (Remote Optical Path Switching Node Operated in Multi-stage Loop Optical Access Network), Institute of Electronics, Information and Communication Engineers Society Convention, 2021, BK-2-3, 2021

SUMMARY OF INVENTION

Technical Problem

An object of the present disclosure is to enable confirmation of connection between optical fibers using a test beam from a housing station even when point-to-point connection is performed in an optical fiber network.

Solution to Problem

In an optical fiber network according to an aspect of the present disclosure, two loop networks in which optical fibers are connected in a loop form are connected using a remote optical path switching node according to the present disclosure. The optical fiber network includes a test optical fiber configured to transmit a test beam to the remote optical path switching node and a tester causing a test beam to be incident on the test optical fiber.

The two loop networks include an upper loop close to the tester that emits a test beam and lower loops away from the tester.

The remote optical path switching node according to the present disclosure includes:

- an optical cross-connect connected to an optical fiber included in the lower loop;
- a test optical coupler connected to a test optical fiber through which a test beam propagates in the upper loop and which is connectable to the optical cross-connect;
- a control unit configured to control the connection between the optical cross-connect and the test optical coupler; and
- a light extraction unit configured to detect a test beam propagating in the upper loop and emitted from the test optical coupler or the optical cross-connect.

According to another aspect of the present disclosure, a monitoring method for the remote optical path switching node is a monitoring method performed by the remote optical path switching node according to the present disclosure.

The control unit connects the upper loop and the lower loop or connects the lower loops to each other using the optical cross-connect and the test optical coupler.

A light extraction unit detects the test beam propagating in the upper loop and emitted from the test optical coupler or the optical cross-connect.

The test optical coupler includes four ports.

First and second ports of the test optical coupler may be respectively connected to optical fibers of different paths in the upper loop network.

The test optical coupler may emit a test beam incident on the first port to a fourth port on a different path from the first port, and emit a test beam incident on the second port to a third port on a different path from the second port.

The optical cross-connect may include four ports.

The third and fourth ports of the optical cross-connect may be respectively connected to optical fibers of different paths in the lower loop network.

The control unit may connect the lower loops to each other by connecting the first port of the optical cross-connect to the third port of the test optical coupler and connecting the second port of the optical cross-connect to the fourth port of the test optical coupler.

The optical cross-connect includes four ports.

The third and fourth ports of the optical cross-connect may be respectively connected to optical fibers of different paths in the lower loop network.

The control unit may connect the upper loop and the lower loop by (i) connecting the fourth port of the test optical coupler to an optical fiber of the upper loop, connecting the third port of the test optical coupler to the first port of the optical cross-connect, and connecting the first port to the third port in the optical cross-connect, or (ii) connecting the third port of the test optical coupler to an optical fiber of the upper loop, connecting the fourth port of the test optical coupler to the second port of the optical cross-connect, and connecting the second port to the fourth port in the optical cross-connect.

The optical cross-connect, the test optical coupler, and the light extraction unit may be integrated.

The foregoing disclosures can be combined in as far as possible.

Advantageous Effects of Invention

In the present disclosure, even when point-to-point connection is performed in an optical fiber network, connection between optical fibers can be confirmed using a test beam from a housing station.

DESCRIPTION OF EMBODIMENTS

Figure 1:
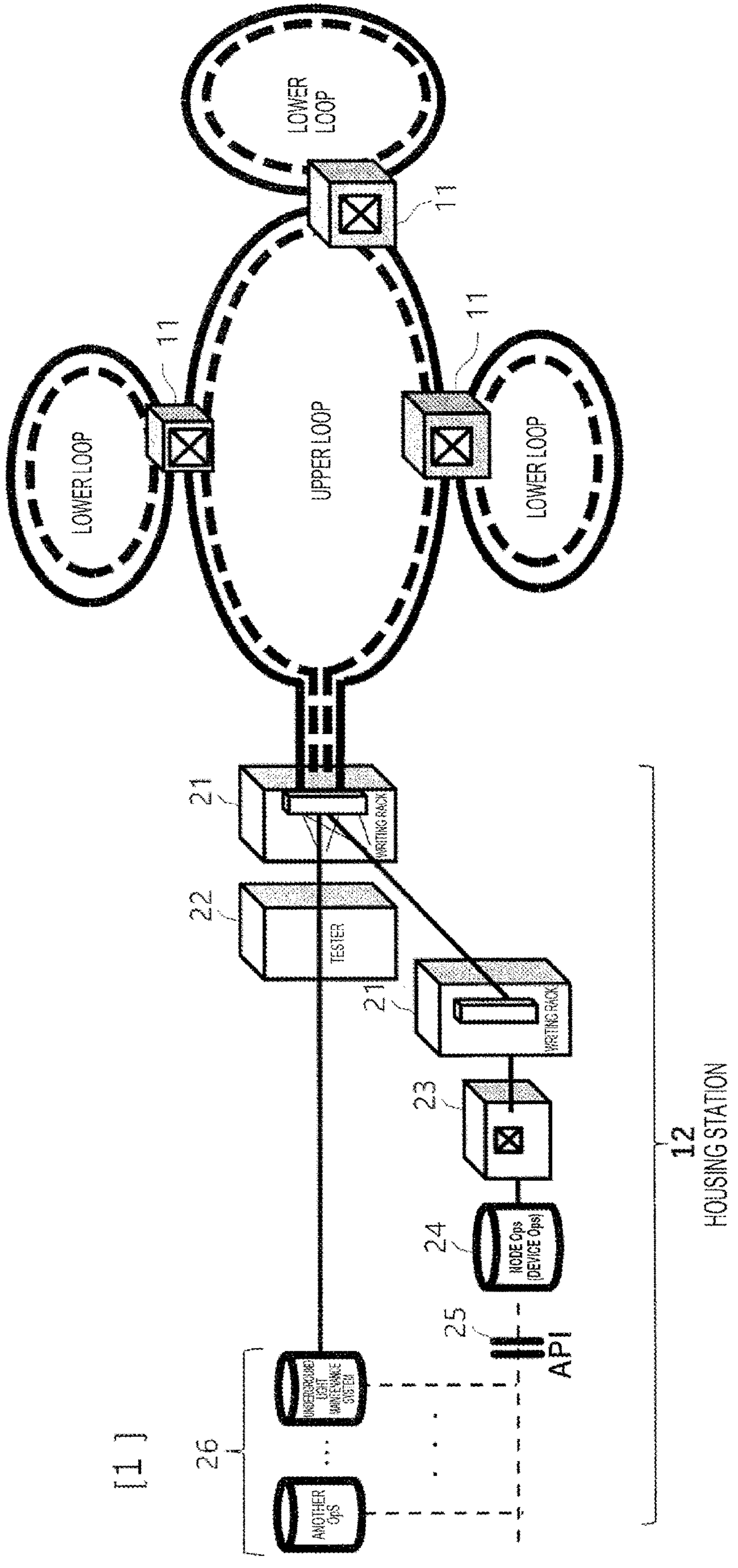
FIG. 1 is a diagram illustrating a configuration example of a multistage loop wiring and a remote optical path switching node.

Hereinafter, embodiments of the present disclosure will be described in detail with reference to the drawings. The present disclosure is not limited to the embodiments to be described below. These examples are merely exemplary, and the present disclosure can be implemented in forms of various modifications and improvements based on the knowledge of those skilled in the art. It is assumed that constituent elements denoted by the same reference numerals in the present specification and the drawings are the same components.

Network Configuration

A configuration of an optical fiber network according to the present disclosure is illustrated in FIG. 1. The optical fiber network according to the present disclosure includes a housing station 12 and a loop network. The housing station 12 includes, for example, a housing station wiring rack 21, a tester 22, a local optical path switching node 23, and a node operation system (Ops) 24. The housing station 12 may be connected to another Ops 26 such as an underground light maintenance system via an application programming interface (API) 25. The tester 22 is a device that emits a test beam. The test beam is incident on an optical fiber of an upper loop in the housing station wiring rack 21.

FIG. 1 illustrates an example in which optical fibers are connected in a loop form to form a loop network, and the loop networks are connected in multiple stages. A remote optical path switching node 11 that connects loop networks is disposed at a position where loops overlap. A loop close to the housing station 12 is defined as an upper loop, and a loop connected to the upper loop is defined as a lower loop. In FIG. 1, three lower loops are used. The remote optical path switching node 11 connecting the upper loop and the lower loops has a function of changing a route of an optical fiber. For switching, an instruction (signal) is issued from the housing station 12 to the remote optical path switching node 11, and the remote optical path switching node 11 performs switching based on the instruction (see Non Patent Literatures 1 and 2).

Figure 2:
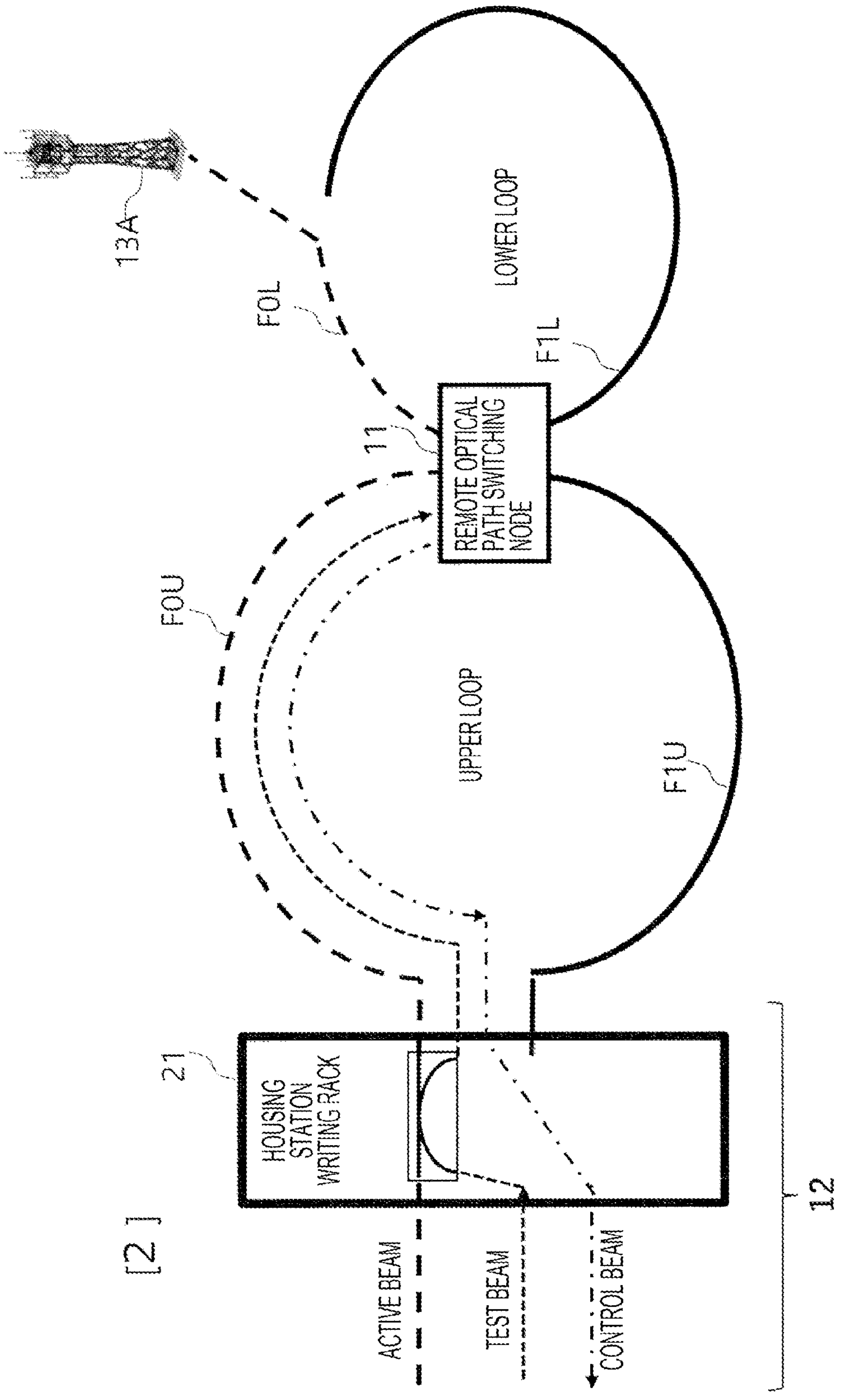
FIG. 2 is a diagram illustrating an example of a connection state of optical fiber lines via a housing station building.
Figure 3:
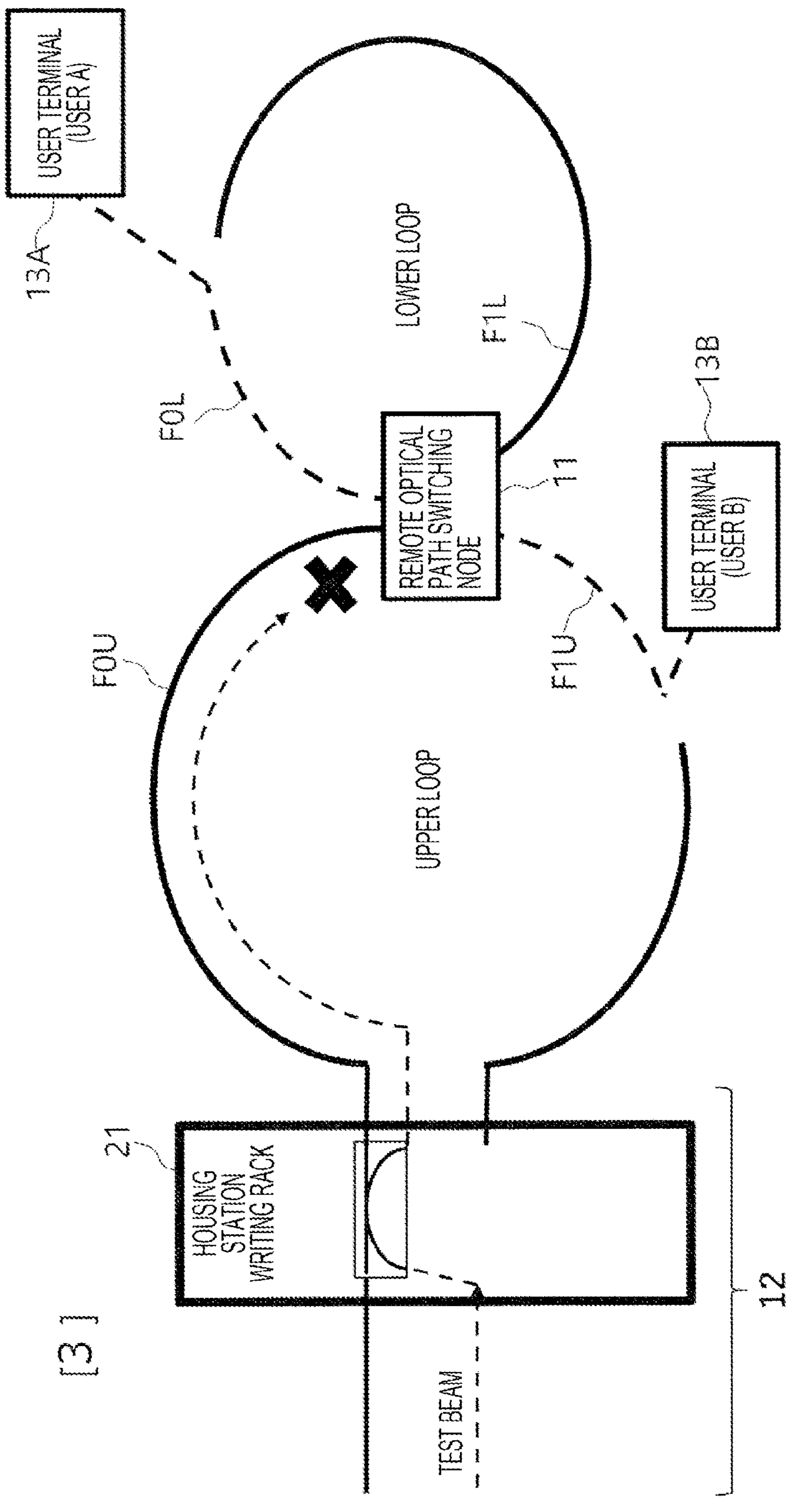
FIG. 3 is a diagram illustrating an example of a connection state of optical fiber lines in the case of PtoP connection.
Figure 4:
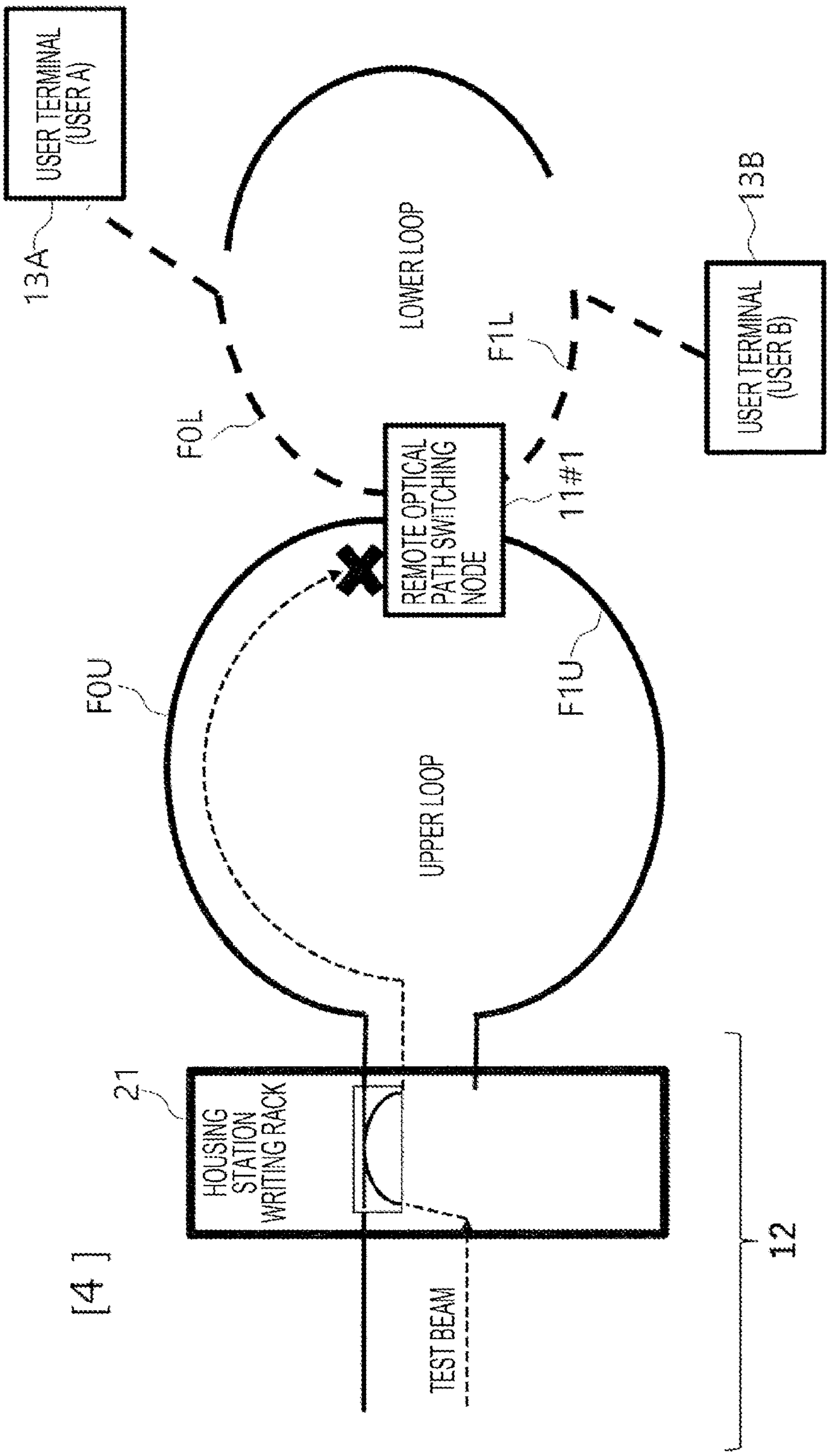
FIG. 4 is a diagram illustrating an example of a state in the case of PtoP connection.

Use examples of the optical network illustrated in FIG. 1 are illustrated in FIGS. 2, 3, and 4. FIG. 2 illustrates a form in which a user terminal 13A is connected to a user terminal 13B (not illustrated) connected to a destination of the housing station 12 via the remote optical path switching node 11. FIGS. 3 and 4 illustrate that the user terminal 13A is connected to the user terminal 13B not via the housing station 12 but via the remote optical path switching node 11.

In the examples of FIGS. 3 and 4, the user terminal 13A and the user terminal 13B are considered as points, and the two points are connected, which is called point-to-point connection (hereinafter defined as P-to-P connection). In n FIG. 2, in order to connect to the user terminal 13A to the user terminal 13B (not illustrated) behind the housing station, this is similarly treated as a P-to-P connection. In the present disclosure, the connection illustrated in FIGS. 2 and 3 is referred to as a PtoP connection from the upper loop to the lower loop. The connection illustrated in FIG. 4 is referred to as PtoP connection between the lower loops.

In FIG. 2, when the housing station 12 and the user terminal 13A are connected in a single core unit, the housing station 12 inserts a test beam into a communication optical fiber F1U which is an active optical fiber, by an optical coupler of the housing station wiring rack 21, and receives a signal from the remote optical path switching node 11, and thus it is possible to confirm a connection state in the remote optical path switching node 11.

Figure 5:
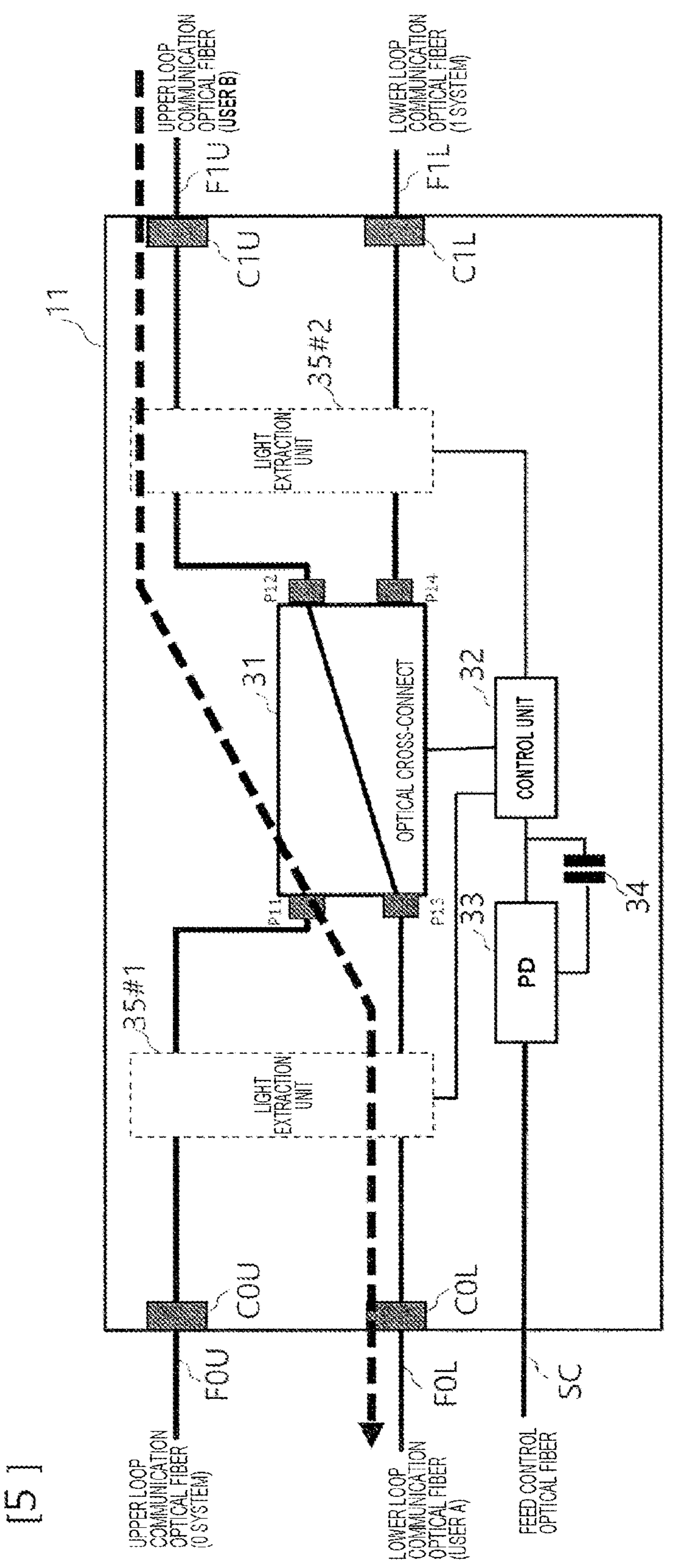
FIG. 5 is a diagram illustrating a configuration example of a remote optical path switching node.
Figure 6:
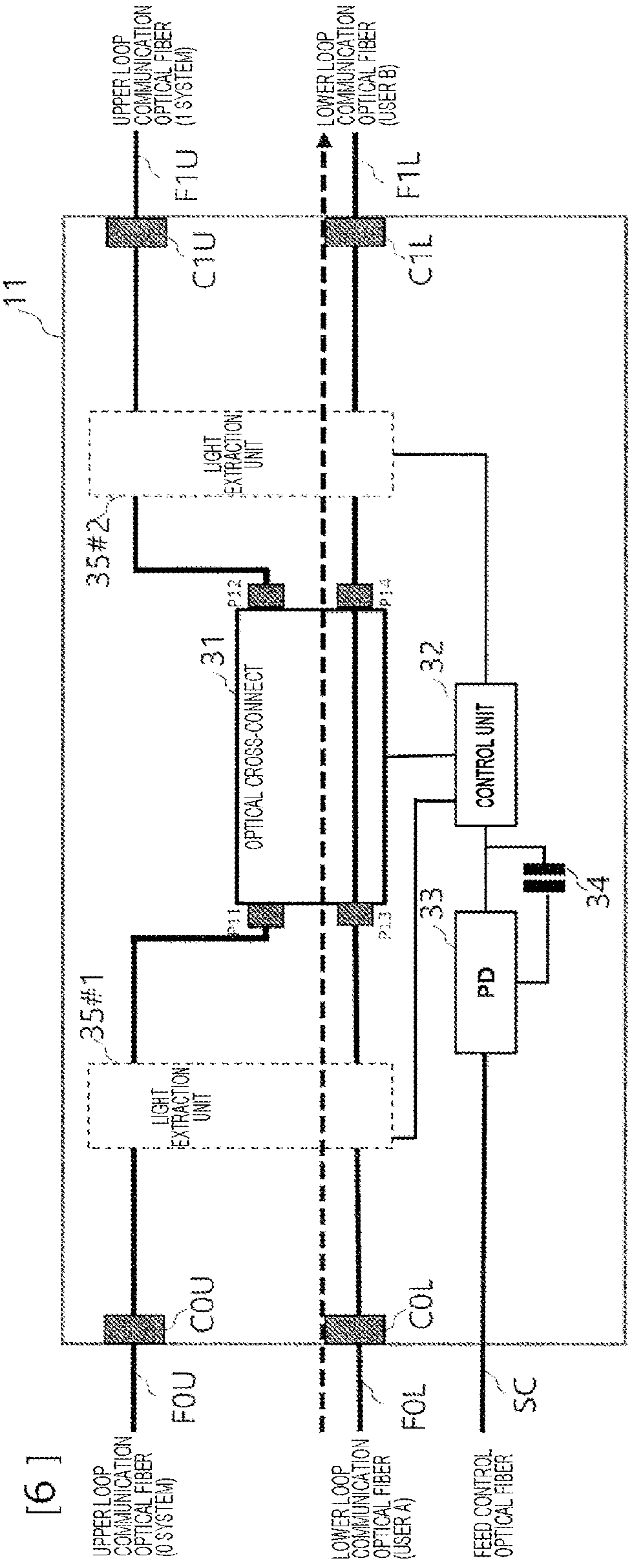
FIG. 6 is a diagram illustrating a configuration example of a remote optical path switching node.

FIGS. 5 and 6 illustrate an example of an internal structure and a function of the remote optical path switching node 11. The remote optical path switching node 11 includes an optical cross-connect 31, two light extraction units 35 #1 and 35 #2, a light receiving unit (PD: Photodiode) 33, a power storage capacitor 34, and a control unit 32 in a central portion. The remote optical path switching node 11 is connected to the communication optical fibers F0U, F1U, F0L, and F1L, and is also connected to the feed control fiber SC.

The optical cross-connect 31 has four ports P11 to P14. The port P11 serves as a first port, the port P12 serves as a second port, the port P13 serves as a third port, and the port P14 serves as a fourth port. According to the present disclosure, an example in which the ports P11 and P12 are connected to the optical fibers F0U and F1U of the upper loop, and the ports P13 and P14 are connected to the optical fibers F0L and F1L of the lower loop will be described.

FIG. 5 illustrates a connection example in the case of the PtoP connection from the upper loop to the lower loop, as illustrated in FIG. 3. When the PtoP connection as illustrated in FIG. 3 is made, the PtoP connection is established by connecting the port P12 and the port P13 of the optical cross-connect 31. In order to confirm that the port P12 and the port P13 are connected, it is necessary to cause the test beam to propagate to the optical fiber connecting the port P12 and the port P13. However, both ends of the communication optical fiber F1U and the communication optical fiber F0L are connected to the user terminals 13A and 13B, and the test beam from the tester 22 cannot be transmitted from the communication optical fiber F1U to the communication optical fiber F0L. Therefore, the housing station 12 cannot confirm whether the optical fiber is connected at the remote optical path switching node 11 (Non Patent Literature 2).

FIG. 6 illustrates a connection example in the case of the PtoP connection between the lower loops illustrated in FIG. 4. When the PtoP connection as illustrated in FIG. 4 is made, the PtoP connection is established by connecting the port P13 and the port P14 of the optical cross-connect 31. In this case, similarly to FIG. 3, the optical fiber from the tester 22 and the optical fiber in the PtoP section cannot be connected. Therefore, since the test beam from the housing station 12 cannot be transmitted to the PtoP section, port information indicating that the optical fibers F0L and F1L are connected may not be ascertained.

Figure 7:
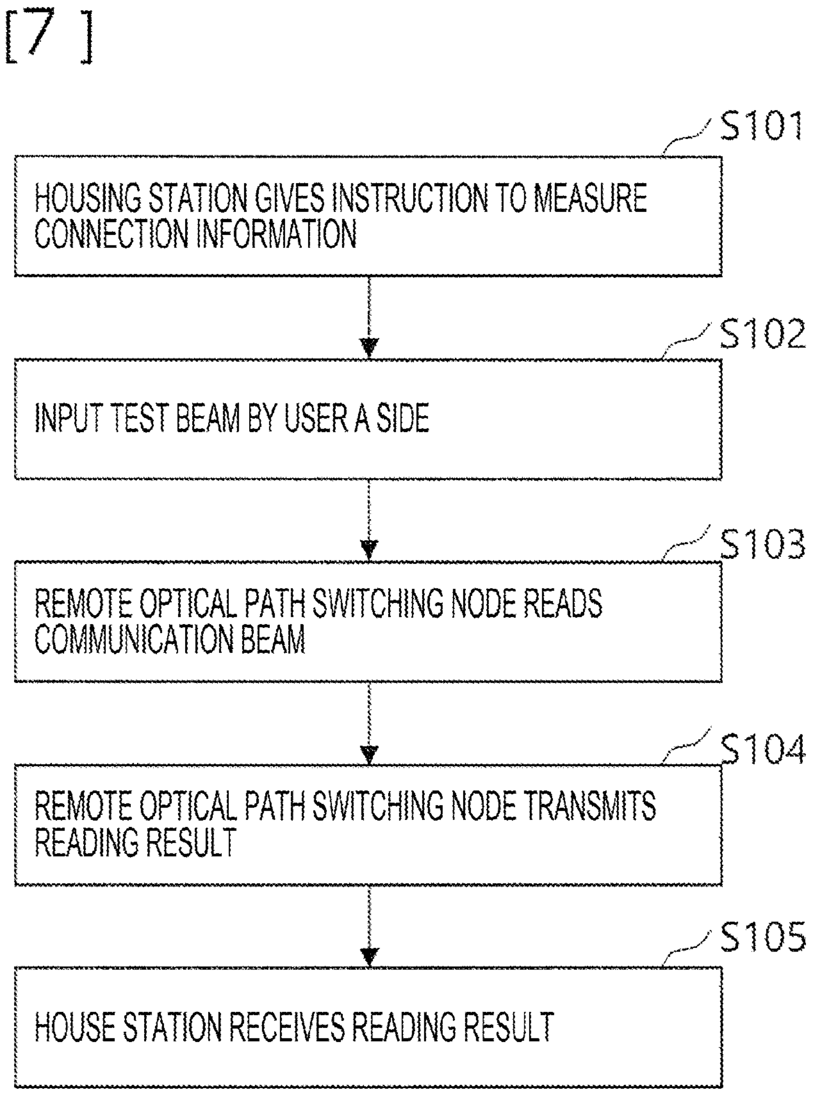
FIG. 7 is a diagram illustrating an example of a method of confirming an optical fiber connection state in a remote optical path switching node in the case of PtoP connection.

In the current technology, in the case of the PtoP connection between the upper loop and the lower loop illustrated in FIG. 3 and the PtoP connection mode between the lower loops illustrated in FIG. 4, the test beam cannot be transmitted from the housing station 12 to the communication optical fiber used in the PtoP section, and thus the port information cannot be acquired. Therefore, when the optical fiber connection state in the remote optical path switching node 11 from the housing station 12 is confirmed, five processes illustrated in FIG. 7 are required. The processes will be described with reference to FIGS. 8 and 9.

Figure 8:
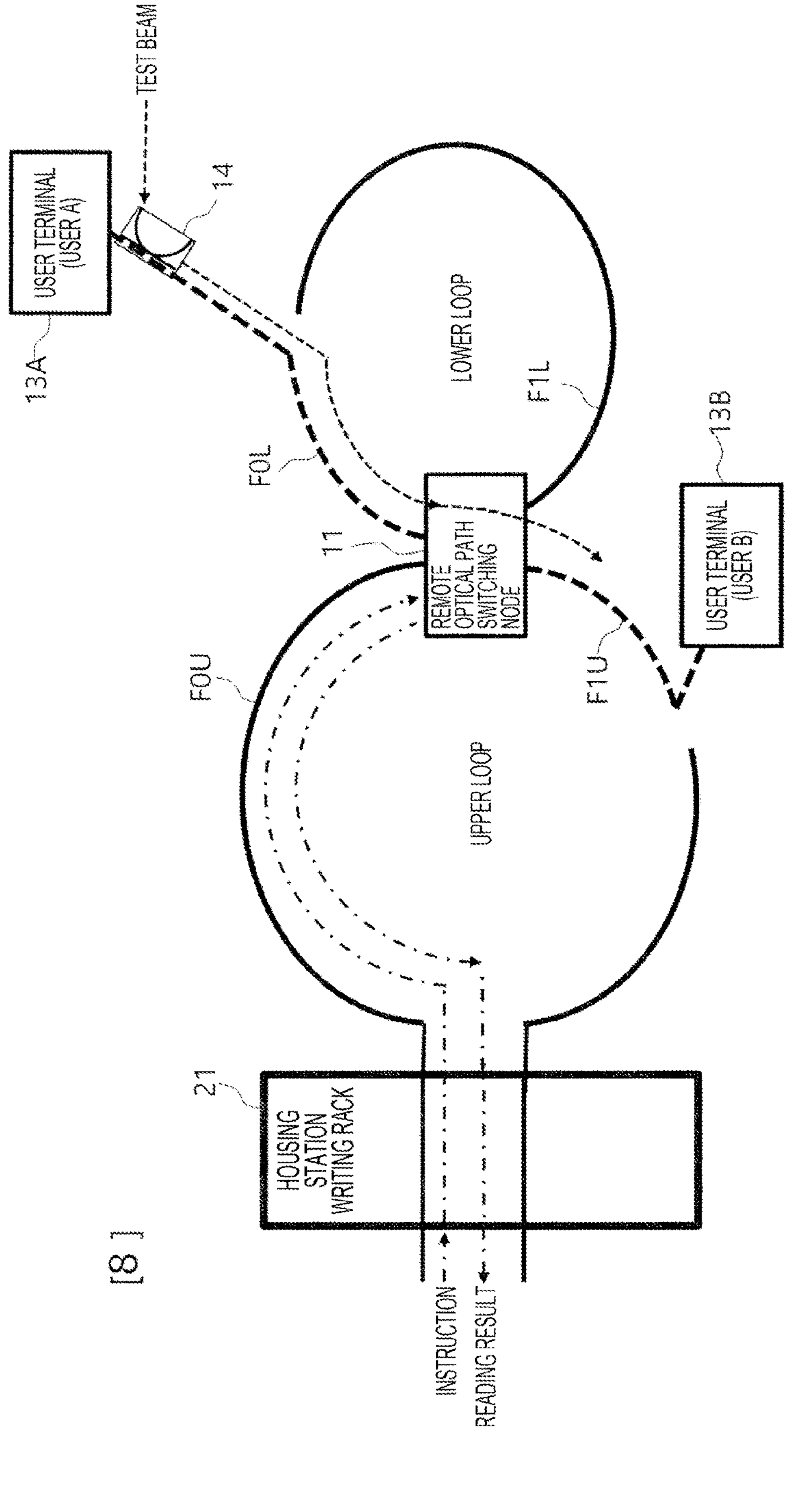
FIG. 8 is a diagram illustrating a method of confirming an optical fiber connection state in a remote optical path switching node in the case of PtoP connection.
Figure 9:
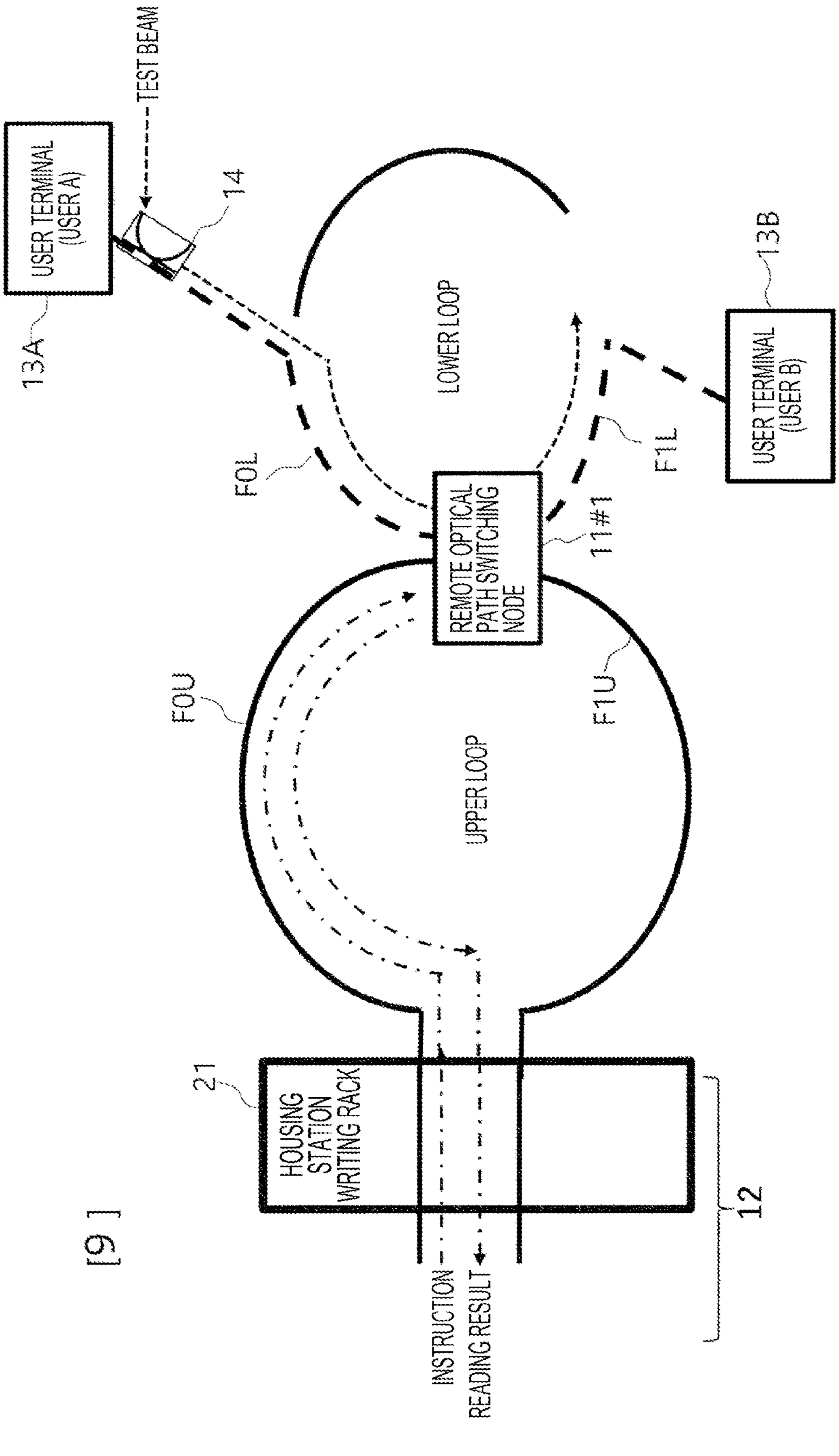
FIG. 9 is a diagram illustrating a method of confirming an optical fiber connection state in a remote optical path switching node in the case of PtoP connection.

As illustrated in FIGS. 8 and 9, it is desired to connect the user terminals 13A and 13B to each other. Therefore, an instruction is output from the housing station 12 to the remote optical path switching node 11. The control unit 32 in the remote optical path switching node 11 moves the optical cross-connect 31 in accordance with an instruction from the housing station 12 to connect the user terminal 13A and the user terminal 13B.

It is necessary to confirm that the connection is established. For this purpose, a dedicated beam for test is used. For a communication beam, a wavelength of 1310 nm to 1550 nm is used. On the other hand, a wavelength of the test beam is 1650 nm. A wavelength different from that of the communication light is used as the test beam. In order to receive the test beam, the optical coupler 14 is installed on one of the user terminals 13A side. The optical coupler 14 includes a plurality of ports, and indicates a 2×2 type. A test beam is input from an available port.

The housing station 12 outputs an instruction to detect connection of the optical fiber to the remote optical path switching node 11 to make preparation in advance (S101).

The test beam is inserted from the optical coupler 14 of the user terminal 13A toward the user terminal 13B (S102). In this process, the test beam is transmitted through the inside of the remote optical path switching node 11 for the first time.

The remote optical path switching node 11 confirms that the test beam has passed. At this time, a communication beam can be read from a light extraction unit provided in advance inside the remote optical path switching node 11 (S103). The remote optical path switching node 11 can send the read port information to the housing station 12 (S104). The housing station 12 receives a result of the test beam passing through the remote optical path switching node 11 (S105).

By performing the foregoing five processes, it is possible to confirm that the user terminal 13A and the user terminal 13B are connected.

Here, in the instruction of which the housing station 12 notifies the remote optical path switching node 11 in step S101, a test beam passing through the communication optical fiber inside the remote optical path switching node 11 is extracted by the light extraction units 35 #1 and 35 #2, and the port information of the extracted light is transmitted to the housing station 12. The port information is information indicating which port connected to the communication optical fiber the test beam has passed through, and specifically, an optical fiber number of the communication optical fiber can be exemplified.

When the housing station 12 acquires the port information in the remote optical path switching node 11 using the method described in FIG. 7, there are the following problems.

First problem: it is necessary to have a facility configuration in which a test beam can be transmitted from the user terminal 13 side.

Second problem: a test beam cannot be sent at any time because user consent is required for sending the test beam.

Third problem: it is operationally inefficient to separately provide an optical fiber only for sending the test beam on the user terminal 13 side.

First Mode for Carrying Out Invention

Figure 10:
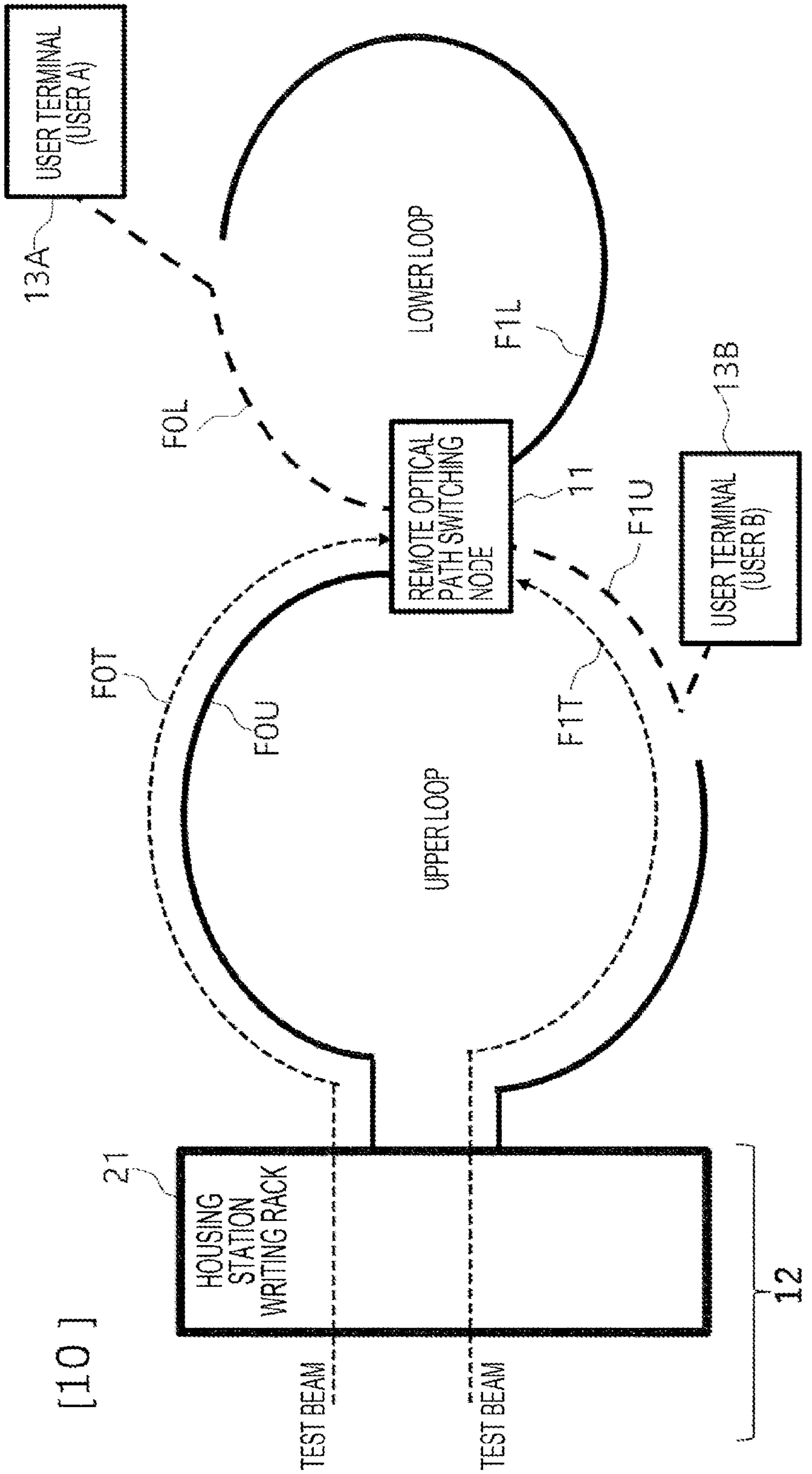
FIG. 10 is a diagram illustrating an example of a connection state of optical fiber lines according to an embodiment of the present disclosure.
Figure 11:
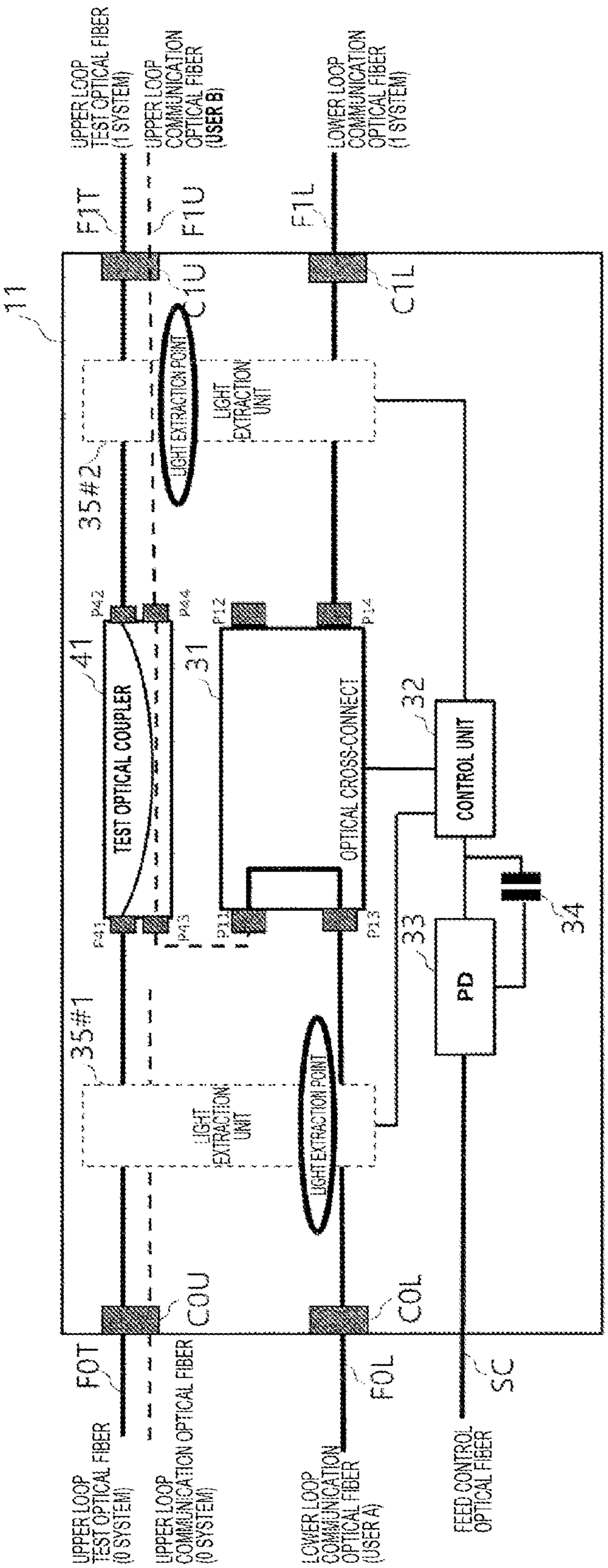
FIG. 11 is a diagram illustrating an example of an optical fiber connection state in a remote optical path switching node according to an embodiment of the present disclosure.

FIG. 10 illustrates an example of a network configuration according to an embodiment of the present disclosure. FIG. 11 illustrates an example of the remote optical path switching node. In the embodiment, the upper loop includes test optical fibers F0T and F1T that connect the housing station 12 and the remote optical path switching node 11. In the configuration, the remote optical path switching node 11 according to the embodiment enables transmission of a test beam from the housing station 12 to the optical fiber used for the PtoP connection despite the PtoP connection from the upper loop to the lower loop.

The remote optical path switching node 11 according to the embodiment includes a test optical coupler 41. The test optical coupler 41 has four ports P41 to P44. The port P41 functions as a first port, the port P42 functions as a second port, the port P43 functions as a third port, and the port P44 functions as a fourth port.

In the present disclosure, the port P41 and the port P42 are connected to the test optical fibers F0T and F1T (0 system and 1 system) of different paths in the upper loop, respectively. The housing station 12 is connected to the ends of the test optical fibers F0T and F1T, and the tester 22 that emits a test beam from the housing station 12 is provided. The test beam is emitted from the housing station 12 and arrives at the test optical coupler 41. The test optical coupler 41 emits a test beam incident on the first port P41 to the port P44 on a different path from the port P41, and emits a test beam incident on the port P42 to the port P43 on a different path from the port P42.

The optical cross-connect 31 includes four ports P11 to P34. The ports P13 and P14 are connected to optical fibers F0L and F1L of different paths in the lower loop, respectively.

The port P43 can be connected to either the optical fiber F0U of the upper loop or the port P11 of the optical cross-connect. The port P44 can be connected to either the optical fiber F1U of the upper loop or the port P12 of the optical cross-connect. The connection between the ports included in the optical cross-connect 31 and the connection between the optical cross-connect 31 and the test optical coupler 41 can be made by the control unit 32.

In the case of the PtoP connection that goes from the upper loop to the lower loop, a connection mode is realized in which the connection from the port P12 to the port P13 of the optical cross-connect 31 is not made, the connection from the port P11 to the port P13 is made, and the connection from the user terminal 13A to the user terminal 13B is made via the test optical coupler 41.

The communication optical fiber F1U of the user terminal 13B is connected to the port P44, and the port P43 of the test optical coupler 41 and the port P11 of the optical cross-connect 31 are connected. Further, the port P11 of the optical cross-connect 31 is connected to the port P13, and the port P13 of the optical cross-connect 31 is connected to the communication optical fiber FOL of the user terminal 13A to construct an optical path formed from the user terminal 13B to the user terminal 13A.

When the test beam is inserted into the test optical fiber F1T from the housing station 12, the test beam is incident on the port P42, passes through the ports P43 and P11, and is emitted from the port P13. The light extraction unit 35 #1 extracts the test beam from the optical fiber F0L connected to the port P13. Accordingly, the port information in the optical fiber F0L (in the embodiment, the optical fiber number of the communication optical fiber F0L connected to the port P13) can be detected.

When the test beam is inserted into the test optical fiber F0T (0 system), the test beam is incident on the port P41 and is emitted from the port P44. The light extraction unit 35 #2 extracts the test beam from the optical fiber F1U. Accordingly, the port information in the optical fiber F1U (in the embodiment, the optical fiber number of the communication optical fiber F1U connected to the port P44) can be detected.

Accordingly, in the embodiment, the port information can be detected by the light extraction units 35 #1 and 35 #2. Therefore, when the control unit 32 transmits a detection result to the housing station 12, it is possible to ascertain the port information between the housing station 12 and the user terminal 13 (between the user terminals 13A and 13B).

In the embodiment, the example in which the port P44 of the test optical coupler 41 is connected to the optical fiber F1U of the upper loop, the port P43 of the test optical coupler 41 is connected to the port P11 of the optical cross-connect 31, and the port P11 is connected to the port P13 in the optical cross-connect 31 has been described. However, the present disclosure is not limited thereto. For example, the control unit 32 may connect the port P43 of the test optical coupler 41 to the optical fiber F0U of the upper loop, connect the port P44 of the test optical coupler 41 to the port P12 of the optical cross-connect 31, and connect the port P12 to the port P14 in the optical cross-connect 31.

Second Mode for Carrying Out Invention

Figure 12:
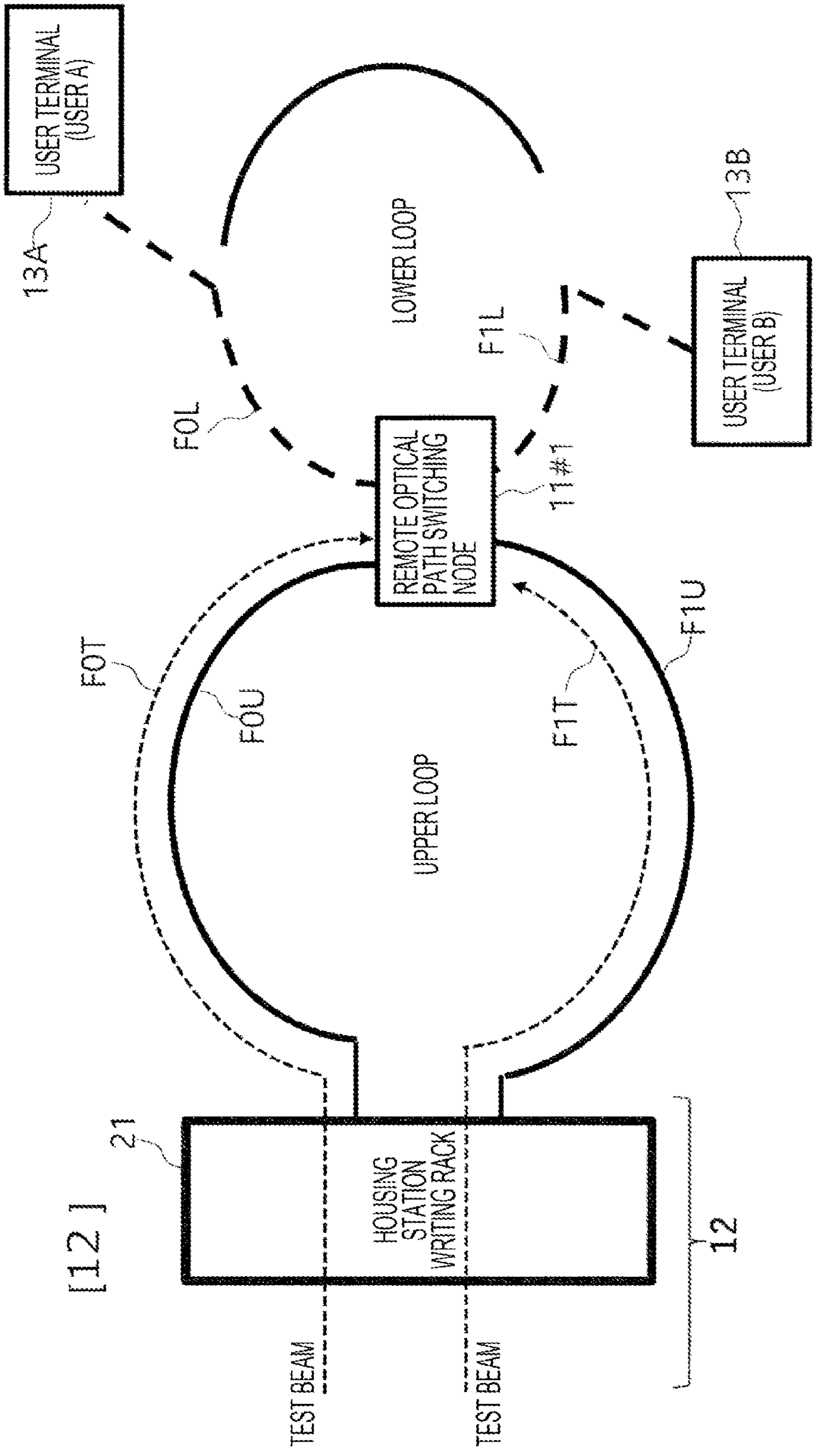
FIG. 12 is a diagram illustrating an example of a connection state of optical fiber lines according to an embodiment of the present disclosure.
Figure 13:
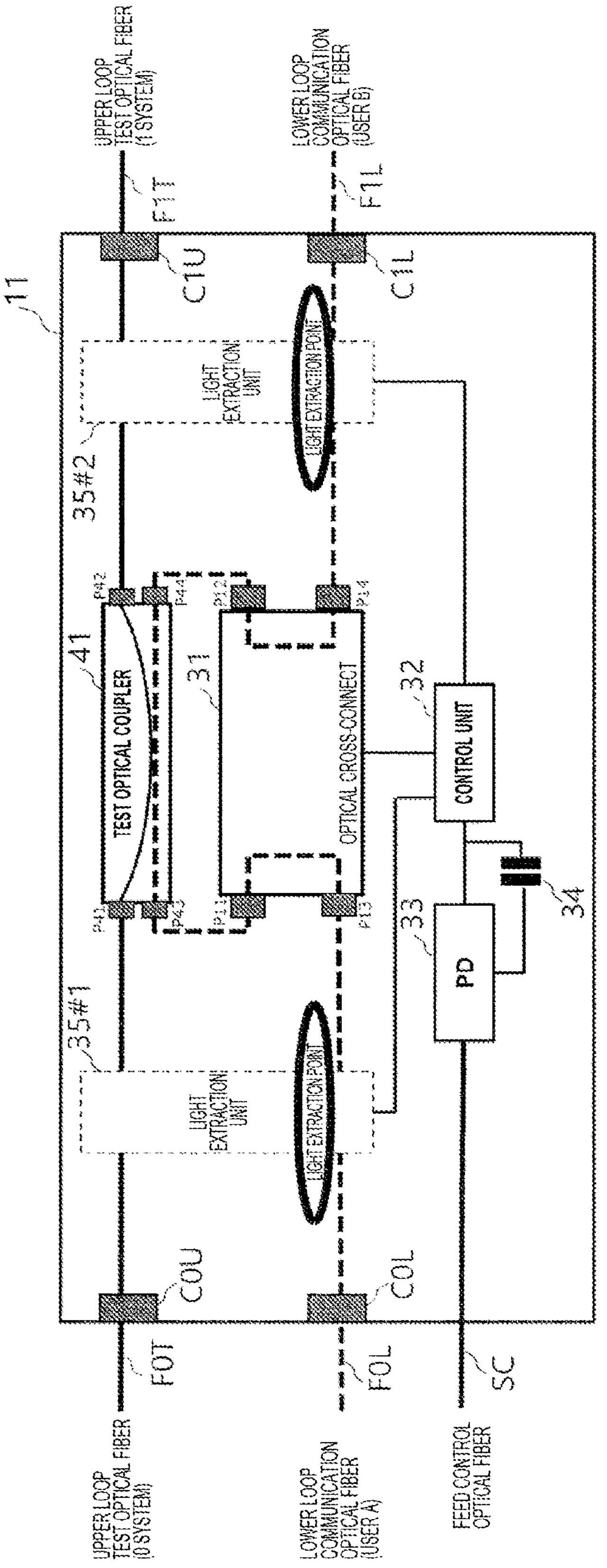
FIG. 13 is a diagram illustrating an example of an optical fiber connection state in a remote optical path switching node according to an embodiment of the present disclosure.

FIG. 12 illustrates an example of a network configuration according to an embodiment of the present disclosure. FIG. 13 illustrates an example of a remote optical path switching node according to the embodiment. A basic configuration is similar to that of the first embodiment. However, the remote optical path switching node 11 according to the embodiment enables transmission of a test beam from the housing station 12 to an optical fiber used for the PtoP connection despite the PtoP connection between the lower loops.

In the case of the PtoP connection in which the lower loops are connected to each other, the control unit 32 connects the port P11 of the optical cross-connect 31 to the port P43 of the test optical coupler 41 and connects the port P12 of the optical cross-connect 31 to the port P44 of the test optical coupler 41.

Further, the control unit 32 connects the user terminal 13A to the user terminal 13B as illustrated in FIG. 13.

the communication optical fiber F0L of the user terminal 13A
the port P13 of the optical cross-connect 31
the port P11 of the optical cross-connect 31
the port P43 of the test optical coupler 41
the port P44 of the test optical coupler 41
the port P12 of the optical cross-connect 31
the port P14 of the optical cross-connect 31
the communication optical fiber F1L of the user terminal 13B By constructing such an optical path, when a test beam is inserted into the test optical fiber F1T from the housing station 12, the test beam enters the port P42, passes through the ports P43 and P11, and is emitted from the port P13. The light extraction unit 35 #1 extracts the test beam from the optical fiber F0L connected to the port P13. Accordingly, the port information in the optical fiber F0L (in the embodiment, the optical fiber number of the communication optical fiber F0L connected to the port P13) can be detected.

When the test beam is inserted into the test optical fiber F0T, the test beam is incident on the port P41, passes through the ports P44 and P12, and is emitted from the port P14. The light extraction unit 35 #2 extracts the test beam from the optical fiber F1L connected to the port P14. Accordingly, the port information in the optical fiber F1L (in the embodiment, the optical fiber number of the communication optical fiber F1L connected to the port P14) can be detected.

Accordingly, in the embodiment, the port information can be detected by the light extraction units 35 #1 and 35 #2. When the control unit 32 transmits a detection result to the housing station 12, connection of the optical fibers between the housing station 12 and the user terminal 13 (between the user terminals 13A and 13B) can be confirmed.

As described above, in the present disclosure, a test can be performed from the housing station 12 without installing the optical coupler 14 in a building managed by a user terminal.

Therefore, there is no time restriction. It is not necessary to prepare an optical fiber for testing on the user terminal side. Accordingly, according to the present disclosure, it is possible to perform an operation efficiently.

In the above-described embodiment, the example in which the optical cross-connect 31, the test optical coupler 41, and the light extraction units 35 #1 and 35 #2 have separate configurations has been described, but two or more of these units may be integrated.

REFERENCE SIGNS LIST

11 Remote optical path switching node
12 Housing station
13 User terminal
14 Light coupler
21 Housing station wiring rack
22 Tester
23 Local optical path switching node
24 Node Ops
25 API
26 Other Ops
31 Optical cross-connect
32 Control unit
33 PD
34 Power storage capacitor
35 Light extraction unit

The invention claimed is:

1. A remote optical path switching node configured to connect two loop networks in which optical fibers are connected in a loop form, wherein the two loop networks include an upper loop close to a tester configured to emit a test beam and lower loops away from the tester, and the remote optical path switching node comprises:

an optical cross-connect connected to an optical fiber included in the lower loop;

a test optical coupler connected to a test optical fiber through which a test beam is configured to propagate in the upper loop and which is connectable to the optical cross-connect;

a control unit configured to control the connection between the optical cross-connect and the test optical coupler; and a light extraction unit configured to detect a test beam propagating in the upper loop and emitted from the test optical coupler or the optical cross-connect.

2. The remote optical path switching node according to claim 1, wherein the test optical coupler includes four ports, first and second ports of the test optical coupler are respectively connected to optical fibers of different paths in the upper loop, and the test optical coupler is configured to emit a test beam incident on the first port to a fourth port on a different path from the first port, and emit a test beam incident on the second port to a third port on a different path from the second port.

3. The remote optical path switching node according to claim 2, wherein the optical cross-connect includes four ports, and the third and fourth ports of the optical cross-connect are respectively connected to optical fibers of different paths in the lower loop, and the control unit is configured to connect the lower loops to each other by connecting the first port of the optical cross-connect to the third port of the test optical coupler and connecting the second port of the optical cross-connect to the fourth port of the test optical coupler.

4. The remote optical path switching node according to claim 2, wherein the optical cross-connect includes four ports, the third and fourth ports of the optical cross-connect are respectively connected to optical fibers of different paths in the lower loop, and the control unit is configured to connect the upper loop and the lower loop by (i) connecting the fourth port of the test optical coupler to an optical fiber of the upper loop, connecting the third port of the test optical coupler to the first port of the optical cross-connect, and connecting the first port to the third port in the optical cross-connect, or (ii) connecting the third port of the test optical coupler to an optical fiber of the upper loop, connecting the fourth port of the test optical coupler to the second port of the optical cross-connect, and connecting the second port to the fourth port in the optical cross-connect.

5. The remote optical path switching node according to claim 1, wherein two or more of the optical cross-connect, the test optical coupler, and the light extraction unit are integrated.

6. An optical fiber network comprising:

the remote optical path switching node according to claim 1;

a test optical fiber configured to transmit a test beam to the remote optical path switching node; and a tester configured to cause a test beam to be incident on the test optical fiber.

7. A monitoring method executed by a remote optical path switching node configured to connect two loop networks in which optical fibers are connected in a loop form, wherein the two loop networks include an upper loop close to a tester configured to emit a test beam and lower loops away from the tester, the remote optical path switching node includes an optical cross-connect connected to an optical fiber included in the lower loop, a test optical coupler connected to a test optical fiber through which a test beam is configured to propagate in the upper loop and which is connectable to the optical cross-connect, and a control unit controlling connection between the optical cross-connect and the test optical coupler, the control unit configured to connect the upper loop and the lower loop or connect the lower loops to each other using the optical cross-connect and the test optical coupler, and a light extraction unit configured to detect the test beam propagating in the upper loop and emitted from the test optical coupler or the optical cross-connect.

* * * * *